2,957,893
Δ[1,4,9(11)]-PREGNATRIENES

Hershel L. Herzog, Mountain View, and David H. Gould, Leonia, N.J., assignors to Schering Corporation, Bloomfield, N.J., a corporation of New Jersey No Drawing. Filed Jan. 20, 1955, Ser. No. 483,167

3 Claims. (Cl. 260—397.45)

This invention relates to a new group of pregnatrienedioldione compounds which are useful intermediates in the preparation of antiarthritic and anti-inflammatory compounds and to processes for the manufacture of same. More particularly, this invention relates to Δ[1,4,9(11)]-pregnatriene-17α,21-diol-3,20-dione and its 21-acyloxy derivatives.

The compounds of this invention may be represented by the following general formula

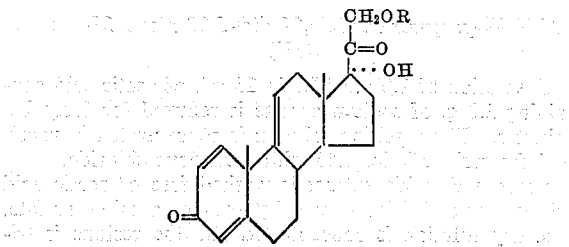

wherein R is a member of the group consisting of hydrogen and lower acyl.

We have discovered that Δ[1,4,9(11)]-pregnatriene-17α,21-diol-3,20-dione, and its 21-acetate in particular, is easily converted into therapeutically active substances such as 9α-fluoro-Δ[1,4]-pregnadiene-17α,21-diol-3,11,20-trione, 9α-fluoro-Δ[1,4]-pregnadiene-11β,17α,21-triol-3,20-dione, and their esters, etc., which themselves are potent antiarthritic and antiinflammatory compounds. The conversion of the compounds of this invention into the aforementioned therapeutically useful substances may be carried out according to the following sequence of reactions:

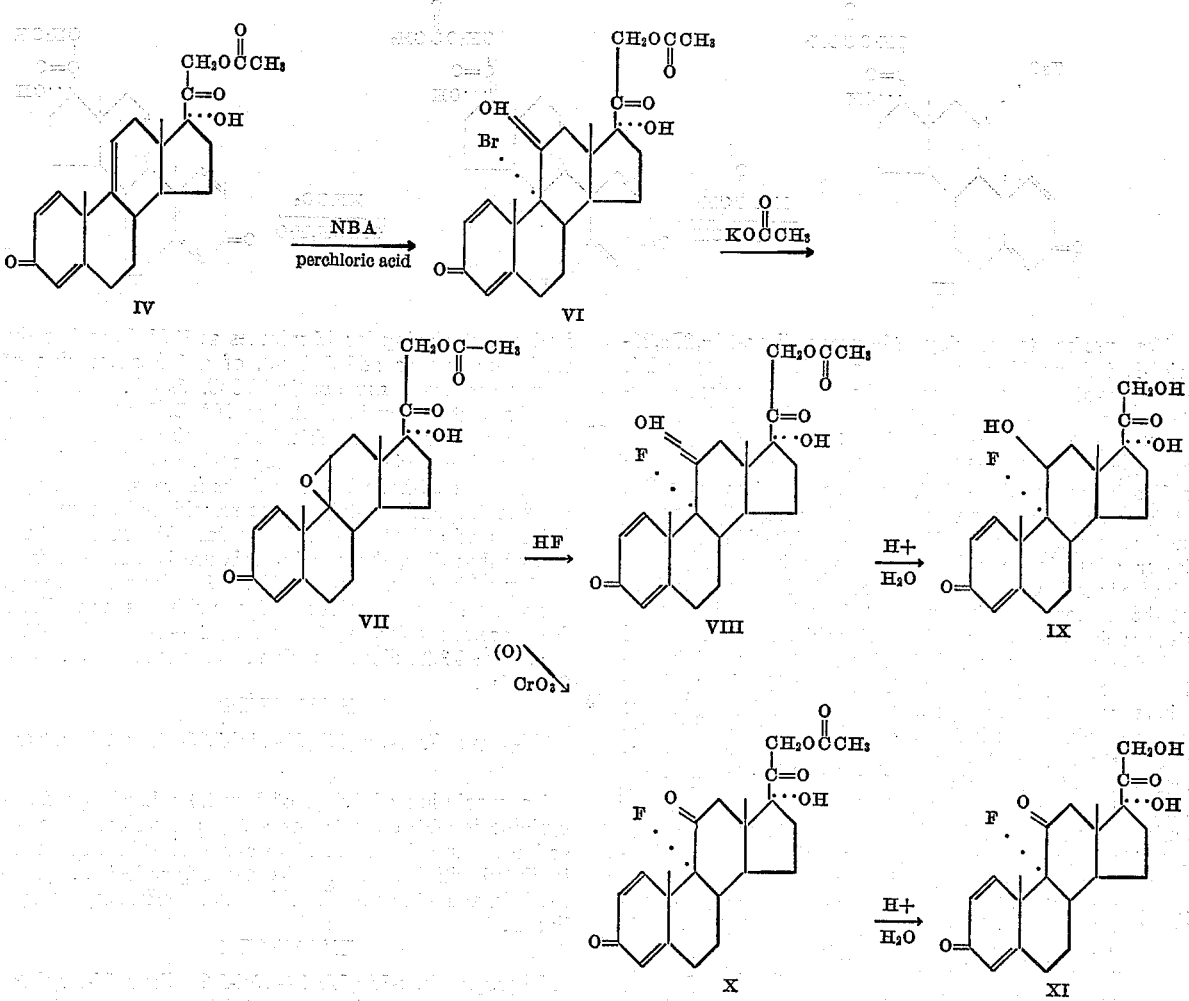

Reaction of Compound IV with N-bromacetamide (NBA) in perchloric acid yields the halohydrin VI. Other reagents which are capable of producing bromonium ion, such as N-bromsuccinimide together with other strong acids such as sulfuric acid may be used. The resultant bromohydrin (VI) is dehalogenated by the action of a weak base such as potassium acetate or sodium acetate in a relatively neutral solvent such as acetone or alcohol yielding the epoxide VII. Subjecting VII to the action of anhydrous hydrogen fluoride, the epoxide ring is re-opened and a 9-alpha fluorine atom is introduced as shown in Compound VIII. Alternatively by employing anhydrous hydrogen chloride, the 9-alpha-chloro analogue of VIII may be formed. Hydrolysis of VIII to yield the free 21-alcohol (IX) is easily accomplished with the aid of aqueous acid.

The compounds of our invention are prepared by relatively simple transformations, part of which are described in the following equations:

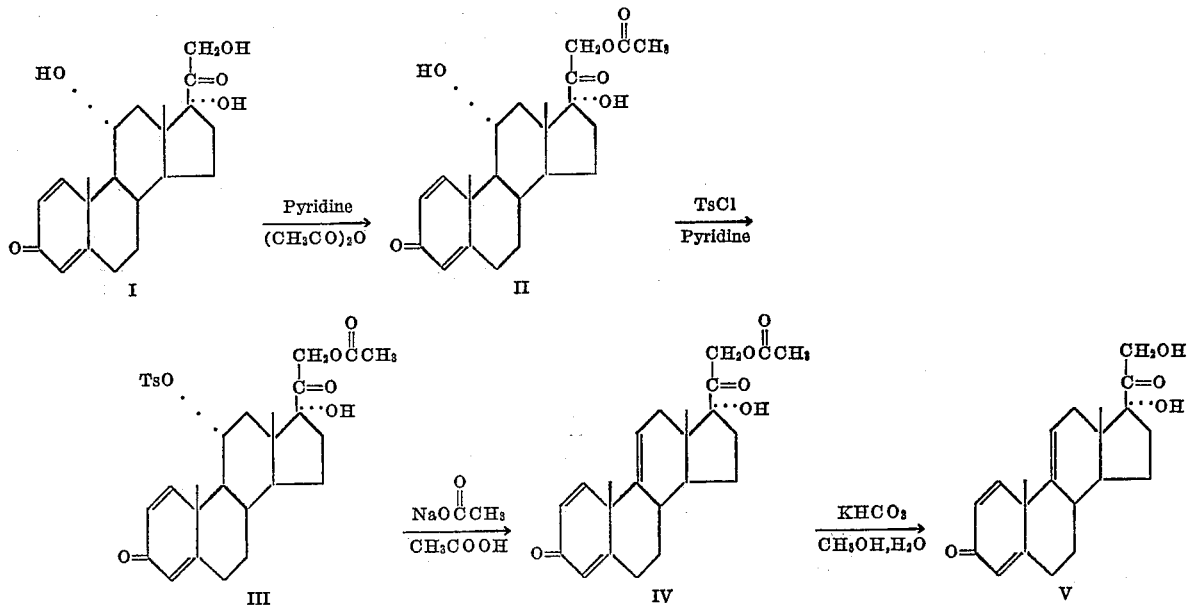

We prefer to employ $\Delta^{1,4}$-pregnadiene-11α,17α,21-triol-3,20-dione (I) as starting material. Compound I is readily available by means of the microbiological transformation of 4-pregnene-11α,17α,21-triol-3,20-dione according to the procedure described in appendant Example 1. Acylation of I with one-molar equivalent of acetic anhydride in pyridine solution affords the 21-acetate (II). It is understood, however, that other acylating agents such as propionic anhydride, butyric anhydride and other lower aliphatic acylating agents may be employed in place of acetic anhydride. Compound II is then esterified at the 11-position with substituted sulfonic acid derivatives such as p-toluenesulfonyl chloride, benzenesulfonyl chloride, methanesulfonyl chloride and the like. We prefer to employ p-toluenesulfonyl chloride in pyridine whereupon the corresponding 11α,p-tosylate (III) is easily obtained. It is important that the 21-position be selectively protected before the 11α-hydroxyl group is esterified with a sulfonic acid derivative. We have found that failure to protect the 21-hydroxyl group against the action of a sulfonyl halide such as p-toluene sulfonyl chloride results in non-rectifiable mixtures. Furthermore, we prefer, in the esterification of the 21-position, to use a relatively mild acylating agent such as the anhydrides heretofore described whereby true selectivity is obtained and the 11-hydroxyl remains unesterified.

Finally, Compound III is converted to $\Delta^{1,4,9(11)}$-pregnatriene-17α,21-dione-3,20-dione 21-acetate (IV) in good yield by refluxing it in acetic acid containing sodium acetate whereupon the sulfonate group is eliminated and an unsaturation is introduced $\Delta^{9(11)}$. Other acid solvents such as propionic acid and the like may be substituted for the acetic acid and other bases such as alkali metal acetates, propionates etc. may be employed to effect the elimination in order to obtain the triene IV.

The following examples depict some of the transformations heretofore described and are entered for illustrative purposes only. It is understood that they in no manner limit the scope of this invention except as defined in the appended claims.

EXAMPLE 1

$\Delta^{1,4}$-pregnadiene-11α,17α,21-triol-3,20-dione (I)

To a 300 ml. Erlenmeyer flask is added 100 ml. of 0.1% yeast extract (Difco) containing 9.0 ml. of 0.2 M potassium dihydrogen phosphate and 9.0 ml of 0.2 M disodium hydrogen phosphate. The flask and its contents are sterilized by autoclaving for 15 minutes at 120° C. and to the sterile medium is added 1 ml. of a 1% suspension of Corynebacterium simplex (A.T.C.C. 6946). The flask and its contents are incubated at 28° C. for 24 hours.

To a second 300 ml. Erlenbeyer flask are added 2 ml. of ethanol and 25 mg. of 4-pregnen-11α,17α,21-triol-3,20-dione. The 24-hour growth culture is transferred aseptically to the flask containing the steroid and the mixture is incubated at 28° C. and shaken for 7½ hours. At the end of that time, the reaction mixture is extracted thoroughly with chloroform and the chloroform extracts are concentrated to a residue. The residue is crystallized from acetone affording 10 mg. of $\Delta^{1,4}$-pregnadiene-11α,17α,21-triol-3,20-dione as elongated prisms, M.P. 246–247° dec.

EXAMPLE 2

$\Delta^{1,4}$-pregnadiene-11α,17α,21-triol-3,20-dione 21-acetate (II)

To a solution of 1.0 g. of I in 20 ml. of anhydrous pyridine is added 0.29 g. of acetic anhydride. The reaction mixture is permitted to stand overnight and then it diluted with ice water. The resulting solid is recrystallized from methylene chloride-hexane affording crystalline II.

EXAMPLE 3

$\Delta^{1,4}$-pregnadiene-11α,17α,21-triol-3,20-dione 11-tosylate 21-acetate (III)

To a solution of 1.0 g. of II in 15 ml. of anhydrous pyridine at 0° is added 1.0 g. of p-toluene sulfonyl chloride. The reaction mixture is allowed to warm to room temperature and stand overnight. It is then diluted with ice water and the resulting precipitate (III) is filtered from the solution.

EXAMPLE 4

$\Delta^{1,4,9(11)}$-pregnatriene-17α,21-diol-3,20-dione 21-acetate (IV)

A solution of 1.0 g. of III in 25 ml. of acetic acid containing 2.0 g. of sodium acetate is refluxed for forty-five minutes. The resulting solution is concentrated in vacuo and the residue is leached with methylene chloride. The methylene chloride extract is washed free of acetic acid with water and dried over anhydrous magnesium sulfate. The dry solution is concentrated and the residue is triturated with ether. The product (IV) is crystallized from acetone-hexane.

EXAMPLE 5

$\Delta^{1,4,9(11)}$-pregnatriene-17α,21-diol-3,20-dione (V)

To a refluxing mixture of 1.0 g. of IV in 10 ml. of methanol under nitrogen is added 0.22 g. of sodium bicarbonate in 1 ml. of water. Refluxing is continued for ten minutes and then the reaction mixture is neutralized with acetic acid. The solvents are removed in vacuo, the residue is leached with methylene chloride, and crystallization of V is induced by the addition of hexane to the concentrated methylene chloride solution.

The present application is a continuation-in-part of application Serial No. 460,508 filed October 5, 1954, now abandoned.

We claim:

1. $\Delta^{1,4,9(11)}$-pregnatriene-17α,21-diol-3,20-dione.
2. $\Delta^{1,4,9(11)}$-pregnatriene-17α,21-diol-3,20-dione 21-acetate of the formula

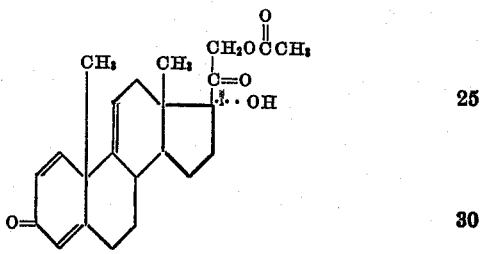

3. A $\Delta^{1,4}$-pregnadiene substituted by ketonic oxygen at the 3- and 20-positions, by hydroxyl at the 17α-position, and by a member of the group consisting of hydroxyl and alkanoyloxy at the 21-position, and having an additional double bond between the 9- and 11-carbons.

References Cited in the file of this patent

UNITED STATES PATENTS

| 2,380,483 | Wagner | July 31, 1945 |
| 2,673,867 | Spero | Mar. 30, 1954 |
| 2,715,640 | Ralls | Aug. 11, 1955 |
| 2,852,511 | Fried | Sept. 16, 1958 |

FOREIGN PATENTS

| 1,056,878 | France | Oct. 28, 1953 |